US011509474B2

(12) United States Patent
Song et al.

(10) Patent No.: US 11,509,474 B2
(45) Date of Patent: Nov. 22, 2022

(54) METHOD AND APPARATUS FOR OBTAINING PRIVACY SET INTERSECTION, DEVICE AND STORAGE MEDIUM

(71) Applicant: Beijing Baidu Netcom Science and Technology Co., Ltd., Beijing (CN)

(72) Inventors: Chuanyuan Song, Beijing (CN); Zhi Feng, Beijing (CN); Liangliang Lv, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/210,305

(22) Filed: Mar. 23, 2021

(65) Prior Publication Data

US 2021/0234689 A1 Jul. 29, 2021

(30) Foreign Application Priority Data

Aug. 7, 2020 (CN) .......................... 202010789775.7

(51) Int. Cl.
*H04L 9/30* (2006.01)
*H04L 9/00* (2022.01)
*H04L 9/06* (2006.01)
*H04L 9/08* (2006.01)
*G06F 21/60* (2013.01)
*G06F 21/62* (2013.01)

(52) U.S. Cl.
CPC ............ *H04L 9/3093* (2013.01); *H04L 9/008* (2013.01); *H04L 9/0618* (2013.01); *H04L 9/0825* (2013.01)

(58) Field of Classification Search
CPC ...... H04L 9/3093; H04L 9/008; H04L 9/0618; H04L 9/0825; H04L 9/0894; H04L 9/03; H04L 2209/46; H04L 2209/04; G06F 21/602; G06F 21/6245
See application file for complete search history.

(56) References Cited

U.S. PATENT DOCUMENTS 10,635,824 B1 *  4/2020  Triandopoulos ...... G06F 21/602
2013/0173787 A1 *  7/2013  Tateishi ................. H04L 9/008
                                                        709/224
2018/0367293 A1 * 12/2018  Chen ........................ H04L 9/30
(Continued)

OTHER PUBLICATIONS

Fast Private Set Intersection from Homomorphic Encryption, by Chen et al., published Nov. 2017 (Year: 2017).*
(Continued)

*Primary Examiner* — Vu V Tran
(74) *Attorney, Agent, or Firm* — Nixon Peabody LLP (57) ABSTRACT

A method and apparatus for obtaining a privacy set intersection are provided. The method may include: encrypting a privacy set of an intersection initiator by using a homomorphic encryption algorithm to generate a cipher text, a cipher text function, a public key, and a private key of the intersection initiator; delivering the cipher text, the cipher text function, and the public key of the intersection initiator to an intersection server; receiving a to-be-decrypted function value of a privacy set of the intersection server from the intersection server; and decrypting the to-be-decrypted function value of the privacy set of the intersection initiator by using the private key, to obtain an intersection element of the privacy set of the intersection initiator and the privacy set of the intersection server.

14 Claims, 6 Drawing Sheets

(56) References Cited

U.S. PATENT DOCUMENTS

2019/0075088 A1*  3/2019  Chen .................. H04L 29/08
2019/0342270 A1*  11/2019 Laine ................ G06F 21/602
2021/0194668 A1*  6/2021  Masters ............. G06F 21/602
2022/0004654 A1*  1/2022  Patel ................ G06F 21/6218

OTHER PUBLICATIONS

European Patent Office, Extended European Search Report for Application No. 21164264.0, dated Sep. 13, 2021 (11 pages).
Hao Chen et al.; "Fast Private Set Intersection from Homomorphic Encryption"; IACR, International Association for Cryptologic Research, vol. 20170407:024218, pp. 1-19, Apr. 3, 2017; XP061023045; DOI: 10.1145/3133956.3134061 (19 pages).
Ruan Ou et al.; "An Efficient Private Set Intersection Protocol for the Cloud Computing Environments"; 2020 IEEE $6^{th}$ International Conference on Big Data Security on Cloud (BigDataSecurity), IEEE International Conference on High Performance and Smart Computing, (HPSC) and IEEE International Conference on Intelligent Data and Security (IDS); May 25, 2020, pp. 254-259; XP033784438; DOI: 10.1109/BigDataSecurity-HPSC-IDS49724.2020.00053 (6 pages).

* cited by examiner

METHOD AND APPARATUS FOR OBTAINING PRIVACY SET INTERSECTION, DEVICE AND STORAGE MEDIUM

CROSS-REFERENCE TO RELATED APPLICATIONS

This application claims priority to Chinese Patent Application No. 202010789775.7, filed on Aug. 7, 2020, titled "Method and apparatus for obtaining privacy set intersection, device, and storage medium," which is hereby incorporated by reference in its entirety.

TECHNICAL FIELD

The present disclosure relates to the field of computer technologies, in particular to the field of cryptography, and more particularly, to a method and apparatus for obtaining a privacy set intersection, a device, and a storage medium.

BACKGROUND

A privacy set intersection is an intersection operation that allows two parties holding respective sets to interactively compute two privacy sets together. After the interactively computing, one or the both parties should obtain an intersection of privacy sets of the two parties and not obtain any information in the privacy set of the other party other than the intersection. With more attention being paid to the privacy protection of user data, the research in this area is more in line with the increasing requirement of protecting the privacy of personal information to the maximum extent while enjoying the convenience of various kinds of personal information-dependent services.

SUMMARY

Embodiments of the present disclosure provide a method and apparatus for obtaining a privacy set intersection, a device, and a storage medium.

According to a first aspect, a method for obtaining a privacy set intersection by an intersection initiator is provided. The method includes: encrypting a privacy set of an intersection initiator by using a homomorphic encryption algorithm to generate a cipher text, a cipher text function, a public key, and a private key of the intersection initiator; delivering the cipher text, the cipher text function, and the public key of the intersection initiator to an intersection server; receiving a to-be-decrypted function value of a privacy set of the intersection server from the intersection server, where the to-be-decrypted function value of the privacy set of the intersection server is obtained by the intersection server based on the public key, the privacy set of the intersection server, and a random security function, where the random security function is used to randomize a non-intersection element in the privacy set of the intersection server; and decrypting the to-be-decrypted function value of the privacy set of the intersection initiator by using the private key, to obtain an intersection element of the privacy set of the intersection initiator and the privacy set of the intersection server.

According to a second aspect, a method for obtaining a privacy set intersection by an intersection server is provided. The method includes: receiving a cipher text, a cipher text function, and a public key from an intersection initiator, where the cipher text, the cipher text function, and the public key are obtained by the intersection initiator by encrypting a privacy set of the intersection initiator using a homomorphic encryption algorithm; and bringing each element in the privacy set of the intersection server to the cipher text function, and calculating a cipher text function value of each element, where in response to a cipher text function value of a certain element in the privacy set of the intersection server being equal to 0, determining that the element is an intersection of the privacy set of the intersection server and the privacy set of the intersection initiator.

According to a third aspect, an apparatus for obtaining a privacy set intersection by an intersection initiator is provided. The apparatus includes: an encryption module configured to encrypt a privacy set of the intersection initiator using a homomorphic encryption algorithm to generate a cipher text, a cipher text function, a public key, and a private key of the intersection initiator; a delivery module configured to deliver the cipher text, the cipher text function, and the public key of the intersection initiator to an intersection server; a receiving module configured to receive a to-be-decrypted function value of a privacy set of the intersection server from the intersection server, where the to-be-decrypted function value of the privacy set of the intersection server is obtained by the intersection server based on the public key, the privacy set of the intersection server, and a random security function, where the random security function is used to randomize a non-intersection element in the privacy set of the intersection server; and a decryption module configured to decrypt the to-be-decrypted function value of the privacy set of the intersection initiator by using the private key, to obtain an intersection element of the privacy set of the intersection initiator and the privacy set of the intersection server.

According to a fourth aspect, an apparatus for obtaining a privacy set intersection by an intersection server is provided. The apparatus includes: a receiving module configured to receive a cipher text, a cipher text function, and a public key from an intersection initiator, where the cipher text, the cipher text function, and the public key are obtained by the intersection initiator by encrypting a privacy set of the intersection initiator using a homomorphic encryption algorithm; and a decryption module configured to bring each element in the privacy set of the intersection server to the cipher text function, and calculate a cipher text function value of each element, and in response to a cipher text function value of a certain element in the privacy set of the intersection server being equal to 0, determine that the element is an intersection of the privacy set of the intersection server and the privacy set of the intersection initiator.

According to a fifth aspect, an electronic device is provided. The electronic device includes: at least one processor; and a memory in communication with the at least one processor. The memory stores instructions executable by the at least one processor, the instructions when executed by the at least one processor, cause the at least one processor to perform the method of any implementation according to the first aspect.

According to a sixth aspect, a non-transitory computer-readable storage medium storing computer instructions is provided. The computer instructions are used to cause a computer to perform the method of any implementation according to the first aspect.

It is to be understood that the description in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWING

The drawings are intended to provide a better understanding of the present disclosure and are not to be construed as limiting the disclosure.

DETAILED DESCRIPTION OF EMBODIMENTS

Brief description of the drawing example embodiments of the present disclosure are described below in connection with accompanying drawings, in which various details of the embodiments of the present disclosure are included to facilitate understanding, and are to be considered as examples only. Accordingly, one of ordinary person skilled in the art will recognize that various changes and modifications may be made to the embodiments described herein without departing from the scope and spirit of the present disclosure. Also, for clarity and conciseness, descriptions of well-known functions and structures are omitted from the following description.

Figure 1:
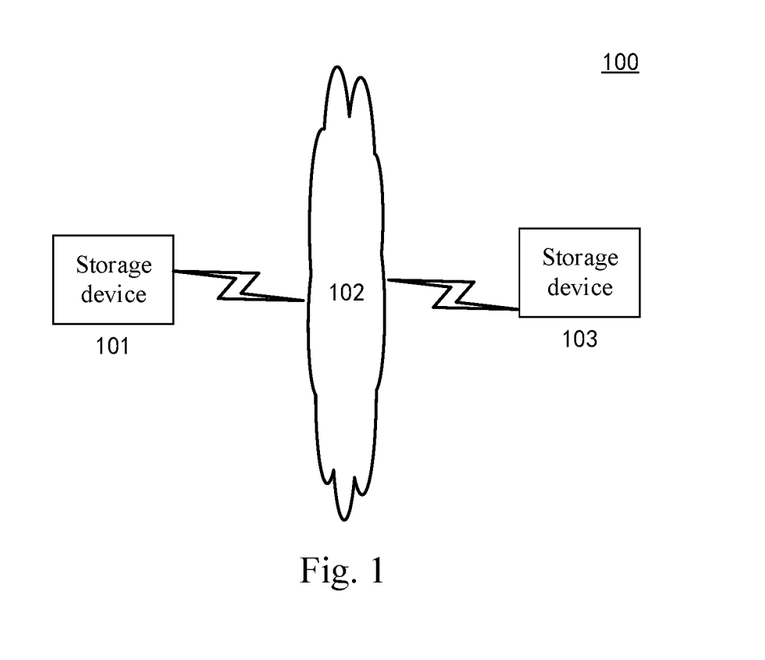
FIG. 1 is an example system architecture in which embodiments of the present disclosure may be applied.

FIG. 1 illustrates an example system architecture 100 of a method for obtaining a privacy set intersection by an intersection initiator or an apparatus for obtaining a privacy set intersection at an intersection initiator side in which embodiments of the present disclosure may be applied.

As shown in FIG. 1, the system architecture 100 may include a storage device 101, a network 102, and a storage device 103. The network 102 serves as a medium for providing a communication link between the storage device 101 and the storage device 103. Network 102 may include various types of connections, such as wired, wireless communication links, or fiber optic cables.

The storage device 101 and the storage device 103 may be a device of an intersection initiator and a device of an intersection server, respectively. The storage device 101 may interact with the storage device 103 via the network 102. The storage device 103 as an intersection server, may provide a to-be-decrypted function value of a privacy set of an intersection server, including but not limited to a database, a user terminal, and the like. Preferably, the storage device 103 as the intersection server may be disconnected from the network 102. The storage device 103 stores a to-be-decrypted function value of the privacy set of the intersection server, and the intersection server delivers the to-be-decrypted function value of the privacy set thereof to the intersection initiator through the storage device 103, the storage device 103 including but not limited to a mobile hard disk, a mobile disk, a USB flash drive, or the like.

The storage device 101 as an intersection initiator, may also be disconnected from the network 102. The storage device 101 may perform the method for obtaining a privacy set intersection by an intersection initiator of the present disclosure, the storage device 101 including but not limited to a user terminal, a computer, or the like. Illustratively, the storage device 101 may be a computer device with a Linux system.

It should be understood that the number of storage devices, networks in FIG. 1 is merely illustrative. There may be any number of storage devices and networks, as required by the implementation.

Figure 2:
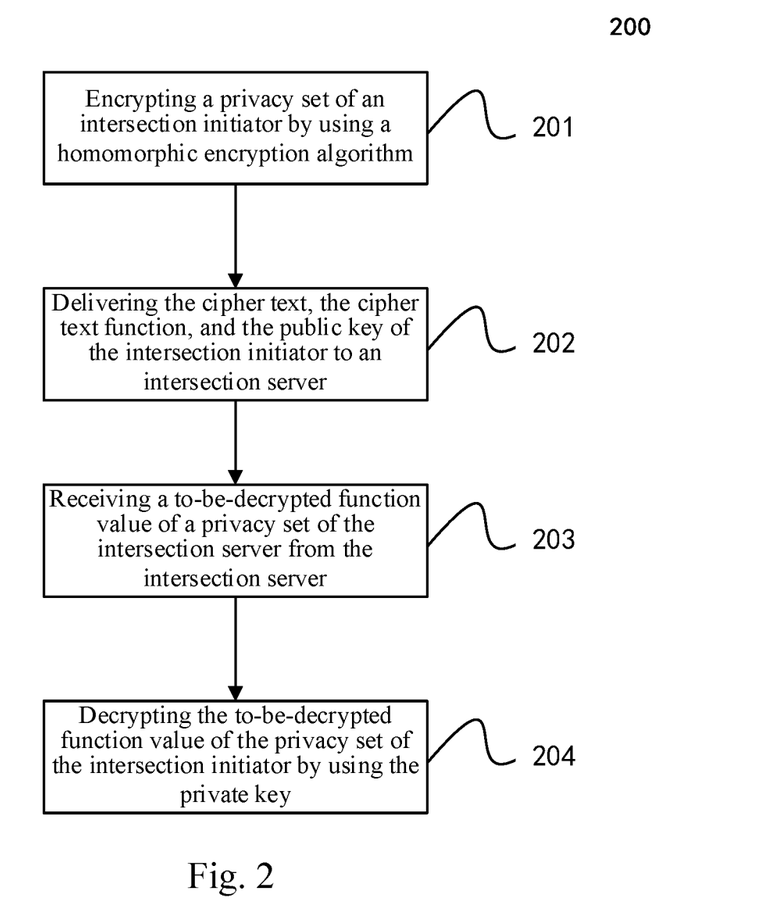
FIG. 2 is a flow diagram of a method for obtaining a privacy set intersection by an intersection initiator according to an embodiment of the present disclosure.

With continuing reference to FIG. 2, a flow 200 of a method for obtaining a privacy set intersection by an intersection initiator according to an embodiment of the present disclosure is shown. The method for obtaining a privacy set intersection by the intersection initiator includes the following steps.

In the step 201, a privacy set of an intersection initiator is encrypted by using a homomorphic encryption algorithm to generate a cipher text, a cipher text function, a public key, and a private key of the intersection initiator.

In this embodiment, the intersection initiator may locally generate a key pair (a public key and a private key) by using the Paillier encryption algorithm. The privacy set of the intersection initiator may be a user identification set, for example, privacy information such as a mobile phone number, an identity card number. Illustratively, the privacy set of the intersection initiator is a set SetA=$\{x_1, x_2, x_3, \ldots, x_n\}$ including n elements (where n is a positive integer). The intersection initiator encrypts the privacy set SetA by using the public key, and generates the cipher text enc_SetA=$\{enc\_x_1, enc\_x_2, enc\_x_3, \ldots, enc\_x_n\}$. The cipher text function f refers to a function for processing the generated cipher text enc_SetA. Here the cipher text function f is provided by the intersection initiator to the intersection server. Based on the characteristics of the homomorphic encryption algorithm, the result of processing the cipher text by using the cipher text function f is equivalent to the result of processing the plaintext (i.e., the privacy set SetA of the intersection initiator).

In the step 202, the cipher text, the cipher text function, and the public key of the intersection initiator are delivered to an intersection server.

In this embodiment, the intersection initiator may complete the delivery through the storage device. The mode of delivery may be an offline mode or an online mode. Preferably, the storage device as an intersection initiator may be disconnected from the network, and the storage device stores a cipher text of the intersection initiator, a cipher text function, and a public key, and the intersection initiator delivers the cipher text, the cipher text function, and the public key to the intersection initiator through the storage device, including but not limited to a mobile hard disk, a mobile disk, a USB flash disk, or the like.

In the step 203, a to-be-decrypted function value of a privacy set of the intersection server is received from the intersection server.

In the present embodiment, the to-be-decrypted function value of the privacy set of the intersection server is obtained by the intersection server according to the public key, the privacy set of the intersection server, and a random security function, where the random security function is used to perform random processing on a non-intersection element in the privacy set of the intersection server. Here, the intersection server uses the public key delivered by the intersection initiator to encrypt its own privacy set SetB={y1, y2, y3, ..., ym} (where m is a positive integer) to generate the cipher text enc_setB={enc_y1, enc_y2, enc_y3, ..., enc_ym} of the privacy set of the intersection server. Each element in the cipher text enc_setB is then brought to a random security function encTj (where 1<=j<=m), the random security function value encTj of each element is calculated, and the random security function value encTj is used as the to-be-decrypted function value of each element and delivered to the intersection initiator. Since the random security function only randomizes the non-intersection element(s) in the set SetB, information of the non-intersection elements in the set SetB of the intersecting server is not disclosed, thereby ensuring the information security.

In step 204, the to-be-decrypted function value of the privacy set of the intersection server is encrypted by using the private key to obtain an intersection element of the privacy set of the intersection initiator and the privacy set of the intersection server.

In the present embodiment, the intersection initiator decrypts the random security function value $encT_j$ by using the local private key, and if the decrypted value is in the local privacy set SetA, it indicates that the value is an intersection element of the privacy set SetA and the privacy set SetB. If the decrypted value is not in the local privacy set SetA, the intersection initiator obtains only a random value, so that information of non-intersection elements of the intersection server set SetB is not leaked.

Compared with the prior art, the intersection initiator does not need to acquire key information of the intersection server, and the intersection information may be decrypted only by using a local private key of the intersection initiator. Moreover, the random security function randomizes the non-intersection elements in the privacy sets of the both parties, and ensures that the non-intersection elements of the intersection server are not leaked to the intersection initiator, thereby realizing the obtaining of the intersection elements of the privacy sets of the both parties without performing real-time network communication while protecting the security of the both parties.

Figure 3:
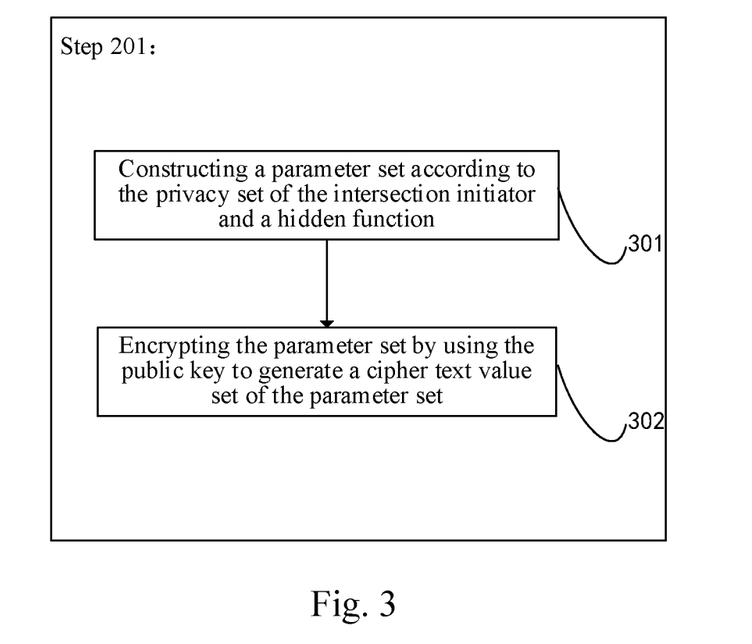
FIG. 3 is a schematic diagram of a method for encrypting privacy set of an intersection initiator using a homomorphic encryption algorithm according to an embodiment of the present disclosure.

With continuing reference to FIG. 3, in some alternative embodiments, the step 201 of "encrypting a privacy set of an intersection initiator by using a homomorphic encryption algorithm to generate a cipher text, a cipher text function, a public key, and a private key of the intersection initiator" includes the following steps.

Step 301, constructing a parameter set according to the privacy set of the intersection initiator and a hidden function.

In the present embodiment, the intersection initiator brings each element in the local privacy set SetA={$x_1$, $x_2$, $x_3$, ..., $x_n$} (where n is a positive integer) into the hidden function f to construct the parameter set SetP={$a_0$, $a_1$, $a_2$, $a_3$, ..., $a_n$} (where n is a positive integer). The hidden function is used to perform mapping protection on the privacy set of the intersection initiator. Illustratively, the mapping protection of the privacy set is usually performed locally by a mathematical method. The element information in the parameter set SetP hides element information in the privacy set of the intersection initiator, and the element information in the original privacy set SetA of the intersection initiator has been shielded, so that the intersection server cannot deduce back the element information in the set SetA, thereby further ensuring the information security. The local privacy set is mapped by the hidden function, and the local original information is further protected from being leaked to the third party.

In an alternative embodiment, the hidden function f may be a polynomial function. Preferably, the intersection initiator constructs the following polynomial function according to the privacy set SetA and the Lagrange interpolation method: $f(x)=(x_1-x)*(x_2-x)* \ldots *(x_n-x)=a_0+a_1x+a_2x^2+a_3x^3+ \ldots +a_nx^n$, where $x_1, x_2, x_3, \ldots, x_n$ are elements in the privacy set SetA of the intersection initiator; coefficients $a_0, a_1, a_2, a_3, \ldots a_n$ in the constructed polynomial function are used as elements of the parameter set SetP, thereby generating the parameter set SetP={$a_0, a_1, a_2, a_3, \ldots, a_n$}. By constructing the polynomial function, the element information of the original privacy set SetA of the intersection initiator has been shield. According to the mathematical complexity, even if a part of the information is cracked, the ID information of the element in the privacy set SetA cannot be deduced back.

Step 302, encrypting the parameter set by using the public key to generate a cipher text value set of the parameter set.

In the present embodiment, the intersection initiator encrypts the elements $a_0, a_1, a_2, a_3, \ldots, a_n$ in the parameter set SetP using the local public key to generate cipher text enc_$a_0$, enc_$a_1$, enc_$a_2$, enc_$a_3$, ..., enc_$a_n$, and deliver the cipher text and the public key together to the intersection server.

Figure 4:
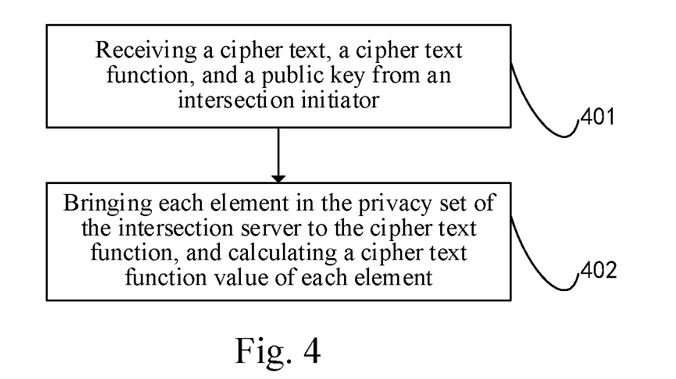
FIG. 4 is a flow diagram of a method for obtaining a privacy set intersection by an intersection server according to an embodiment of the present disclosure.

With continuing reference to FIG. 4, there is shown a flow diagram of a method for obtaining a privacy set intersection by an intersection server according to an embodiment of the present disclosure, which includes the following steps.

Step 401, receiving a cipher text, a cipher text function, and a public key from an intersection initiator.

In the present embodiment, the cipher text, the cipher text function, and the public key are obtained by the intersection initiator by encrypting the privacy set of the intersection initiator by using a homomorphic encryption algorithm. For details on how the intersection initiator encrypts the privacy set of the intersection initiator by using the homomorphic encryption algorithm and the technical effects thereof, reference may be made to the related descriptions of step 201 and steps 301-302 in the corresponding embodiments of FIG. 2 and FIG. 3, respectively, and the repeated details are not described herein.

Step 402, bringing each element in the privacy set of the intersection server to the cipher text function, and calculating a cipher text function value of each element.

In the present embodiment, the intersection server brings each element in the local privacy set SetB={$y_1, y_2, y_3, \ldots y_m$} to the cipher text function. If a cipher text function value of a certain element is equal to 0, then the element is an intersection of the privacy set of the intersection server and the privacy set of the intersection initiator. Illustratively, the cipher text received from the intersection initiator may be used as a parameter of the cipher text function. Here, the cipher text may be obtained by encrypting by the intersection initiator the elements in the privacy set SetA of the intersection initiator, or may be obtained by bringing by the intersection initiator the elements in the privacy set SetA of the intersection initiator to a hidden function. For details on how to obtain the cipher text and the technical effects thereof, reference may be made to the related description of step 201 and steps 301-302 of the corresponding embodiment in FIGS. 2 and 3, respectively, and the repeated details are not described herein.

In an alternative embodiment, the intersection server may bring SetP={enc_$a_0$, enc_$a_1$, enc_$a_2$, enc_$a_3$, ..., enc_$a_n$} as a cipher text and local privacy set SetB=$\{y_1, y_2, y_3, \ldots, y_m\}$ to the polynomial function as a cipher text function: $f(x)=(x_1-x)*(x_2-x)* \ldots *(x_n-x)=a_0+a_1x+a_2x^2+a_3x^3+ \ldots +a_nx^n$. The function value encF $(y_j)=enc\_a_0+enc\_a_1y_j+enc\_a_2y_j^2+ \ldots +enc\_a_ny_j^n$ of each element in the local privacy set SetB is calculated, where $1<=j<=m$. If a decrypted value of an element $y_j$ is equal to 0, it indicates that the element is an intersection of the privacy set SetA and the privacy set SetB.

In the present embodiment, the nature of the polynomial function is ingeniously utilized, so that the calculation amount of the decryption process can be greatly reduced, thereby improving the decryption efficiency.

In an alternative embodiment, the method for obtaining a privacy set intersection by an intersection server according to the embodiment of the present disclosure further includes: encrypting the privacy set of the intersection server according to the public key received from the intersection initiator to generating a cipher text of the privacy set of the intersection server; calculating a random security function value corresponding to each element in the cipher text of the privacy set of the intersection server according to the random security function, where the random security function is used to randomize a random security function value corresponding to a cipher text of a non-intersection element in the privacy set of the intersection server; and delivering the random security function value corresponding to each element in the privacy set of the intersection server to the intersection initiator. For details on how to calculate the random safety function value and the technical effect thereof, reference may be made to the related description of step 203 of the corresponding embodiment in FIG. 2, and the repeated details are not described herein.

In an alternative embodiment, the encrypting a privacy set of the intersection server according to a public key received from the intersection initiator to generate a cipher text of the privacy set of the intersection server includes: constructing a parameter set according to the privacy set of the intersection server and a hidden function, where the hidden function is used to perform mapping protection on the privacy set of the intersection server, and element information in the parameter set hides element information of the privacy set of the intersection server; and encrypting the parameter set by using a public key to generating a cipher text value set of the parameter set, where element information in the cipher text value set is the cipher text of a private set of the intersection server.

In an alternative embodiment, the calculating a random security function value corresponding to each element in the cipher text of the privacy set of the intersection server according to the random security function includes: calculating a hidden function value of the privacy set of the intersection server according to the parameter set constructed by the intersection initiator and the hidden function; randomizing the hidden function value of the privacy set of the intersection server by using a perturbation number; and adding a randomization processing result of the hidden function value of the privacy set of the intersection server and the cipher text of the privacy set of the intersection server to obtain a random security function value corresponding to each element in the cipher text of the privacy set of the intersection server.

In this embodiment, the hidden function may be a polynomial function constructed according to a local privacy set and a Lagrange interpolation method. For details on how to construct a polynomial function and the technical effects thereof, reference is made to the related description of step 301 of the embodiment corresponding to FIG. 3, and the repeated details are not described herein.

In the present embodiment, a random security function $encT_j=r*encF(y_j)+enc\_y_j$ is provided. Here, the intersection server encrypts the local privacy set SetB by using the public key to obtain the cipher text enc_$y_j$, and encF($y_j$) is the hidden function value of the privacy set of the intersection server. Preferably, the intersection server may bring the parameter set SetP=$\{enc\_a_0, enc\_a_1, enc\_a_2, enc\_a_3, \ldots, enc\_a_n\}$ received from the intersection initiator, and local privacy set SetB=$\{y_1, y_2, y_3, \ldots, y_m\}$ to the polynomial function: $f(x)=(x_1-x)*(x_2-x)* \ldots *(x_n-x)=a_0+a_1x+a_2x^2+a_3x^3+ \ldots +a_nx^n$ as a hidden function. The hidden function value encF($y_j$)=$enc\_a_0+enc\_a_1y_j+enc\_a_2y_j^2+ \ldots +enc\_a_ny_j^n$ of each element in the set Setb is calculated, where $1<=j<=m$, and if the element in the set SetB is an intersection element, the hidden function value encF($y_j$) of the element is equal to 0. The intersection server generates a perturbation number r at random and multiplies the perturbation number r by encF($y_j$), so that the random processing of the hidden function value of the non-intersection element in the set SetB may be realized. By the random security function provided in this embodiment, safety protection of the non-intersection element in the SetB may be realized.

Figure 5:
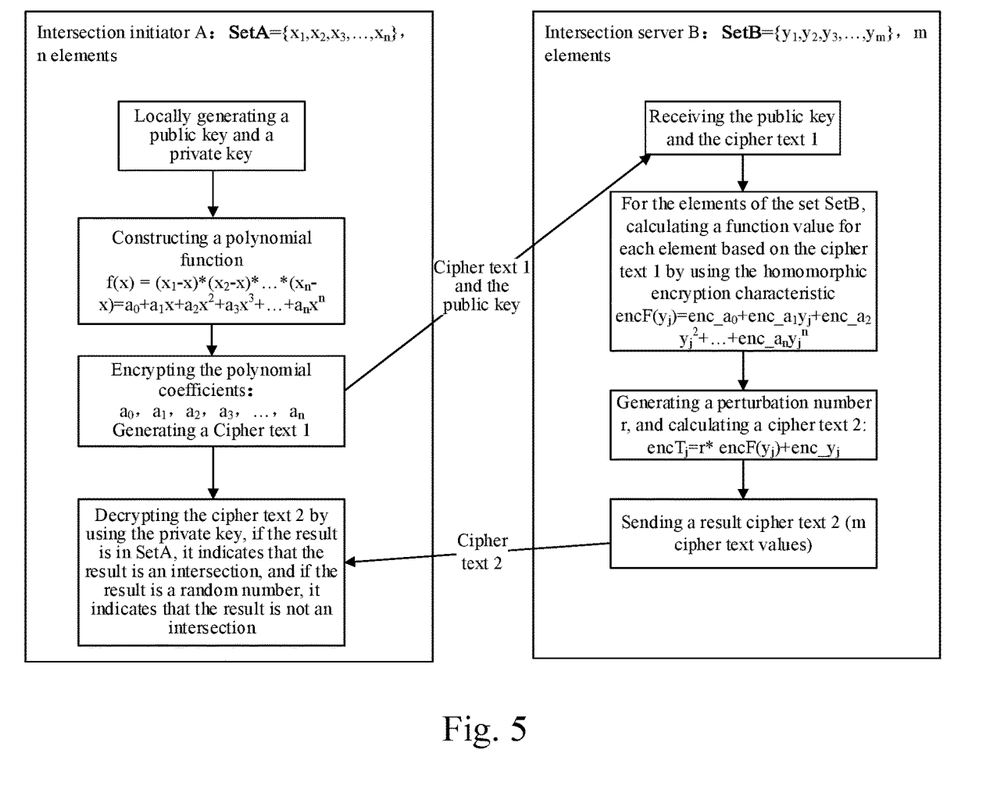
FIG. 5 shows a schematic diagram of an application scenario of a method for obtaining a privacy set intersection according to an embodiment of the present disclosure.

In an alternative embodiment, mapping protection may be performed on the privacy set SetB of the intersection server first by using the hidden function Illustratively, the intersection server brings each element in a local privacy set SetB=$\{y_1, y_2, y_3, \ldots, y_m\}$ (where m is a positive integer) to the hidden function $f_1$ to construct the parameter set Set_p=$\{b_0, b_1, b_2, b_3, \ldots, b_n\}$ (where n is a positive integer), and then encrypts the parameter set Set_p by using the public key to obtain the cipher text enc_$b_j$. The obtained cipher text enc_$b_j$ is brought to the random security function $encT_j=r*encF(y_j)+enc\_b_j$. There may be a risk that the local original information may be leaked to a third party by using the public key to directly encrypt the local privacy set SetB. The privacy set of the intersection server is mapped by the hidden function, and the original information of the intersection server is further protected from being leaked to the third party. With continuing reference to FIG. 5, for ease of understanding, FIG. 5 illustrates a schematic diagram of an application scenario of the method for obtaining a privacy set intersection according to an embodiment of the present disclosure.

As shown in FIG. 5, the method for obtaining a privacy set intersection according to the embodiment of the present disclosure includes the following steps.

1. The intersection initiator A locally generates a public key and a private key using a homomorphic encryption (Paillier) algorithm;

2. The intersection initiator A constructs a polynomial function: $f(x)=(x_1-x)*(x_2-x)* \ldots *(x_n-x)=a_0+a_1x+a_2x^2+a_3x^3+ \ldots +a_nx^n$ based on the local privacy set SetA=$\{x_1, x_2, x_3, \ldots, x_n\}$ and the Lagrange interpolation method;

3. The intersection initiator A encrypts the coefficients $a_0, a_1, a_2, a_3, \ldots a_n$ of the polynomial function using the local public key to generate the cipher text 1, and deliveries the cipher text 1 and the public key to the intersection server B;

4. The intersection server B receives the public key and the cipher text 1;

5. For the local privacy set SetB of the intersection server B, the function value: EncF($y_j$)=$enc\_a_0+enc\_a_1y_j+enc\_a_2y_j^2+ \ldots +enc\_a_ny_j^n$ is calculated for each element of SetB based on the cipher text 1 by using the homomorphic encryption characteristic;

6. Generating a perturbation number r locally at the intersection server B, and calculating a cipher text 2: $EncT_j=r*encF(y_j)+enc\_y_j$;

7. Sending a result cipher text 2 to the intersection initiator A, where the result cipher text 2 contains m cipher text values;

8. The intersection initiator A decrypts the cipher text 2 locally by using the private key. If the element is in SetA, it indicates that the element is an intersection, and if the element is a random number, it indicates that the element is not an intersection of SetA and SetB.

Figure 6:
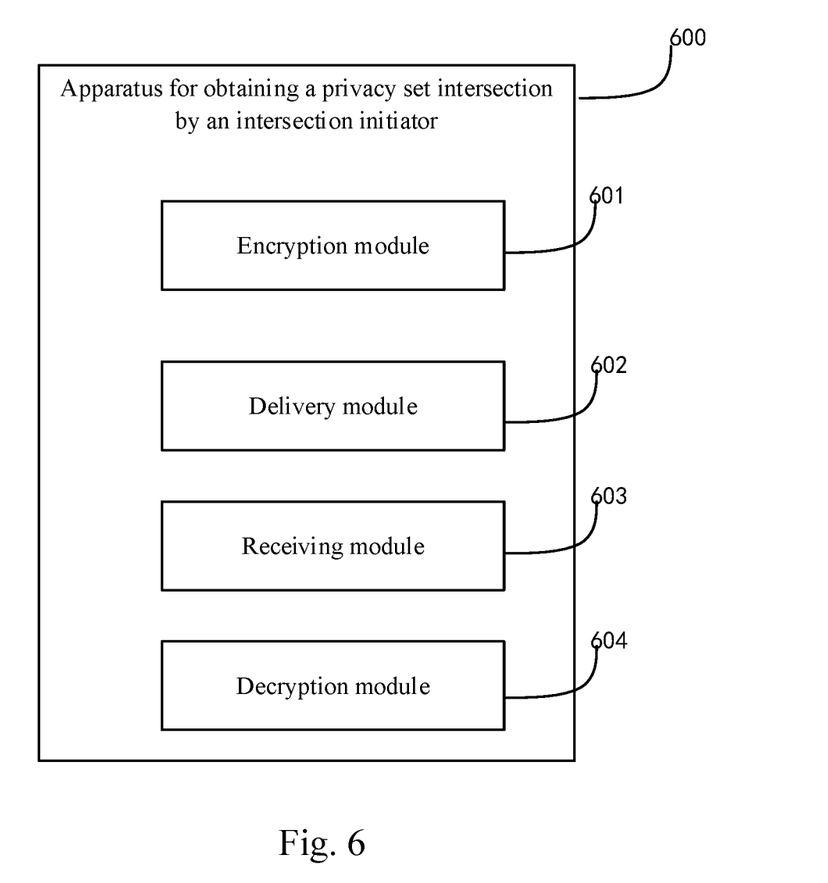
FIG. 6 illustrates an apparatus for obtaining a privacy set intersection by an intersection initiator according to an embodiment of the present disclosure.

With further reference to FIG. 6, as an implementation of the method shown in each of the above figures, an embodiment of the present disclosure provides an apparatus for obtaining a privacy set intersection by an intersection initiator, which corresponds to the method embodiment shown in FIG. 2, and the apparatus is particularly applicable to various electronic devices.

As shown in FIG. 6, the apparatus 600 for obtaining a privacy set intersection of the present embodiment includes an encryption module 601 configured to encrypt a privacy set of the intersection initiator by using a homomorphic encryption algorithm to generate a cipher text, a cipher text function, a public key, and a private key of the intersection initiator; a delivery module 602 configured to deliver the cipher text, the cipher text function, and the public key to an intersection server; a receiving module 603 configured to receive a to-be-decrypted function value of a privacy set of the intersection server from the privacy set of the intersection server, where the to-be-decrypted function value of the privacy set of the intersection server is obtained by the intersection server according to the public key, the privacy set of the intersection server, and a random security function, where the random security function is used to randomize a non-intersection element in the privacy set of the intersection server; and a decryption module 604 configured to decrypt the to-be-decrypted function value of the privacy set of the intersection server by using the private key to obtain an intersection element of the privacy set of the intersection initiator and the privacy set of the intersection server.

In the apparatus for obtaining a privacy set intersection by an intersection initiator of present embodiment, the specific processing of the encryption module 601, the delivery module 602, the receiving module 603, and the decryption module 604 and the technical effects thereof may be described with reference to the related description of steps 201-204 in the corresponding embodiment in FIG. 2, and repeated details are not described herein again.

In some alternative implementations of the present embodiment, the encryption module is further configured to construct a parameter set according to the privacy set of the intersection initiator and a hidden function, where the hidden function is used to perform mapping protection on the privacy set of the intersection initiator, and element information in the parameter set hides element information of the privacy set of the intersection initiator; encrypt the parameter set by using the public key to generate a cipher text value set of the parameter set, where element information in the cipher text value set is the cipher text of the intersection initiator.

In some alternative implementations of the present embodiment, the hidden function is a polynomial function constructed according to the privacy set of the intersection initiator and a Lagrange interpolation method.

Figure 7:
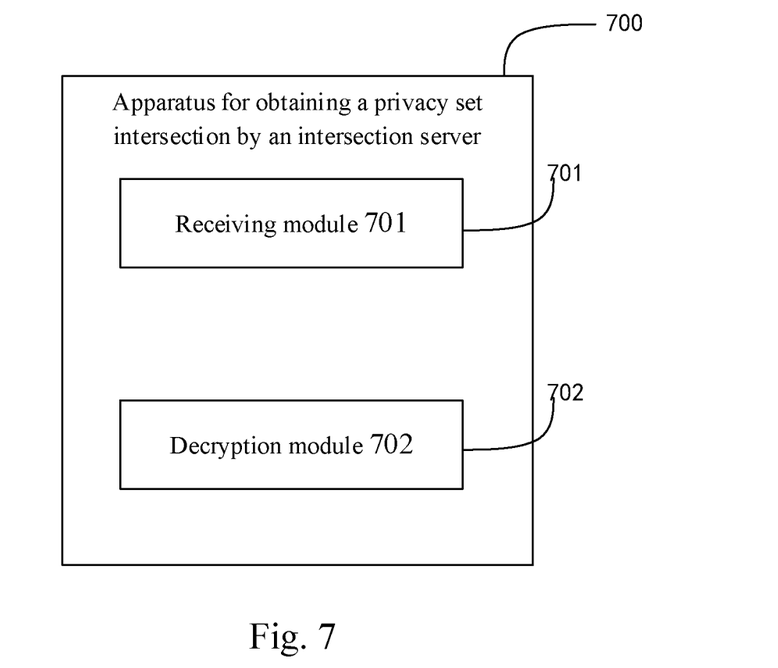
FIG. 7 illustrates an apparatus for obtaining a privacy set intersection by an intersection server according to an embodiment of the present disclosure

With further reference to FIG. 7, as an implementation of the method shown in each of the above figures, an embodiment of the present disclosure provides an apparatus for obtaining a privacy set intersection by an intersection server, which corresponds to the method embodiment shown in FIG. 4, and the apparatus is particularly applicable to various electronic devices.

As shown in FIG. 7, the apparatus 700 for obtaining a privacy set intersection by an intersection server of the present embodiment includes: a receiving module 701 configured to receive a cipher text, a cipher text function, and a public key from an intersection initiator, where the cipher text, the cipher text function, and the public key are obtained by encrypting the privacy set of the intersection initiator by the intersection initiator using a homomorphic encryption algorithm; and a decryption module 702 configured to bring each element in the privacy set of the intersection server to the cipher text function, and calculate a cipher text function value of each element, and in response to a cipher text function value of a certain element in the privacy set of the intersection server being equal to 0, determine that the element is an intersection of the privacy set of the intersection server and the privacy set of the intersection initiator.

In the apparatus for obtaining a privacy set intersection by an intersection server in the present embodiment, the specific processing of the receiving module 701 and the decryption module 702 and the technical effects thereof may be described with reference to the related description of steps 401-402 of the corresponding embodiment in FIG. 4, and repeated details are not described herein again.

In some alternative implementations of the present embodiment, the apparatus further includes an encryption module configured to encrypt the privacy set of the intersection server according to the public key received from the intersection initiator to generate a cipher text of the privacy set of the intersection server; a randomizing module configured to calculate a random security function value corresponding to each element in the cipher text of the privacy set of the intersection server according to a random security function, where the random security function is used to randomize a random security function value corresponding to a cipher text of a non-intersection element in the privacy set of the intersection server; and a delivery module configured to deliver the random security function value corresponding to each element in the privacy set of the intersection server to the intersection initiator.

In some alternative implementations of the present embodiment, the encryption module is further configured to: construct a parameter set according to the privacy set of the intersection server and a hidden function, where the hidden function is used to perform mapping protection on the privacy set of the intersection server, and element information in the parameter set hides element information of the privacy set of the intersection server; and encrypt the parameter set by using the public key to generate a cipher text value set of the parameter set, where the element information in the cipher text value set is the cipher text of the private set of the intersection server.

In some alternative implementations of the present embodiment, the randomization module is further configured to: calculate a hidden function value of the privacy set of the intersection initiator based on the parameter set constructed by the intersection initiator and the hidden function, where the hidden function is used to perform mapping protection on the privacy set of the intersection initiator; randomize the hidden function value of the privacy set of the intersection server by using a perturbation number; and add a randomization processing result of the hidden function value of the privacy set of the intersection server to the cipher text of the privacy set of the intersection server to obtain a random security function value corresponding to each element in the cipher text of the privacy set of the intersection server.

In some alternative a randomization of the present embodiment, the hidden function is a polynomial function constructed according to a local privacy set and a Lagrange interpolation method.

According to an embodiment of the present disclosure, the present disclosure further provides an electronic device and a readable storage medium.

Figure 8:
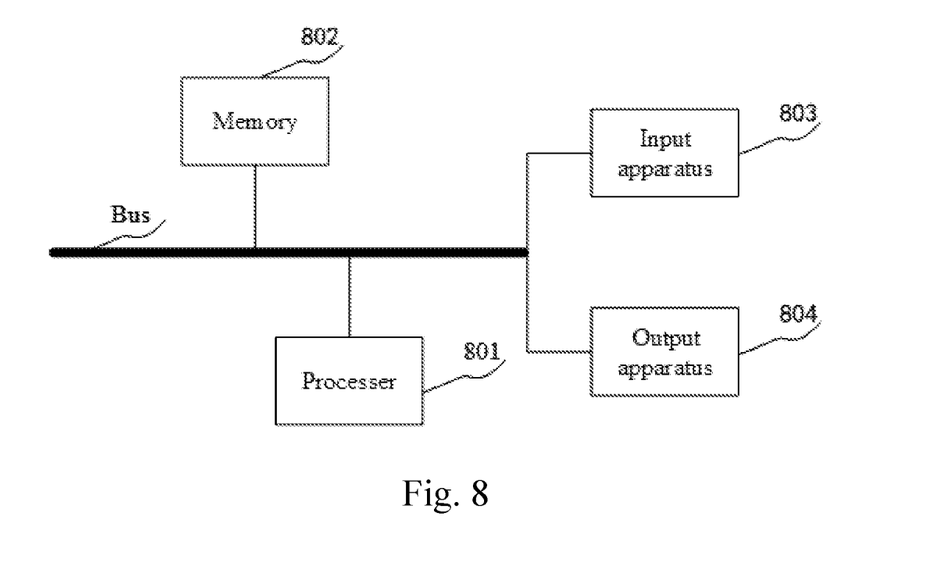
FIG. 8 is a block diagram of an electronic device used to implement the method for obtaining a privacy set intersection according to embodiments of the present disclosure.

As shown in FIG. 8, which is a block diagram of an electronic device of a method for obtaining a privacy set intersection according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the electronic device includes: one or more processors 801, a memory 802, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 8, one processor 801 is used as an example.

The memory 802 is a non-transitory computer readable storage medium provided by the present disclosure. The memory stores instructions executable by at least one processor, so that the at least one processor performs the method for obtaining a privacy set intersection provided by the present disclosure. The non-transitory computer readable storage medium of the present disclosure stores computer instructions for causing a computer to perform the method for obtaining a privacy set intersection provided by the present disclosure.

The memory 802, as a non-transitory computer readable storage medium, may be used to store non-transitory software programs, non-transitory computer executable programs and modules, such as program instructions/modules corresponding to the method for obtaining a privacy set intersection in the embodiments of the present disclosure (for example, the encryption module 601, the delivery module 602, the receiving module 603, and the decryption module 604 shown in FIG. 6). The processor 801 executes the non-transitory software programs, instructions, and modules stored in the memory 602 to execute various functional applications and data processing of the server, that is, to implement the method for obtaining a privacy set intersection in the foregoing method embodiment.

The memory 802 may include a storage program area and a storage data area, where the storage program area may store an operating system and at least one function required application program; and the storage data area may store data created by the use of the electronic device according to the method for obtaining a privacy set intersection, etc. In addition, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories remotely provided with respect to the processor 801, and these remote memories may be connected to the electronic device of the method for obtaining a privacy set intersection through a network. Examples of the above network include but are not limited to the Internet, intranet, local area network, mobile communication network, and combinations thereof.

The electronic device of the method for obtaining a privacy set intersection may further include: an input apparatus 803 and an output apparatus 804. The processor 801, the memory 802, the input apparatus 803, and the output apparatus 804 may be connected through a bus or in other methods. In FIG. 8, connection through a bus is used as an example.

The input apparatus 803 may receive input digital or character information, and generate key signal inputs related to user settings and function control of the electronic device of the method for obtaining a privacy set intersection, such as touch screen, keypad, mouse, trackpad, touchpad, pointing stick, one or more mouse buttons, trackball, joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals.

The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, first, a homomorphic encryption algorithm is used to encrypt a privacy set of the intersection initiator to generate a cipher text, a cipher text function, a public key, and a private key of the intersection initiator; next, the cipher text, the cipher text function, and the public key of the intersection initiator are delivered to an intersection server; thereafter, a to-be-decrypted function value of the privacy set of the intersection server is obtained by the intersection server according to the public key, the privacy set of the intersection server, and a random security function, where the random security function is used to randomize a non-intersection element in the privacy set of the intersection server; finally, the private key is used to decrypt the to-be-decrypted function value of the privacy set of the intersection server to obtain an intersection element of the privacy set of the intersection initiator and the privacy set of the intersection server, so that the semi-honest model is built. At the same time, the semi-homomorphic characteristic of the encryption algorithm is utilized to ensure that the intersection initiator obtains the intersection result by means of offline without revealing the information of the privacy set of the both parties.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for obtaining a privacy set intersection by an intersection initiator, comprising:

encrypting a privacy set of an intersection initiator by using a homomorphic encryption algorithm to generate a cipher text, a cipher text function, a public key, and a private key of the intersection initiator by: constructing a parameter set according to the privacy set of the intersection initiator and a hidden function, wherein the hidden function is used to perform mapping protection on the privacy set of the intersection initiator, and element information in the parameter set hides element information of the privacy set of the intersection initiator; and encrypting the parameter set by using the public key to generate a cipher text value set of the parameter set, wherein element information in the cipher text value set is the cipher text of the intersection initiator;

delivering the cipher text, the cipher text function, and the public key of the intersection initiator to an intersection server;

receiving a to-be-decrypted function value of a privacy set of the intersection server from the intersection server, wherein the to-be-decrypted function value of the privacy set of the intersection server is obtained by the intersection server based on the public key, the privacy set of the intersection server, and a random security function, wherein the random security function is used to randomize a non-intersection element in the privacy set of the intersection server; and decrypting the to-be-decrypted function value of the privacy set of the intersection server by using the private key, to obtain an intersection element of the privacy set of the intersection initiator and the privacy set of the intersection server.

2. The method according to claim 1, wherein the hidden function is a polynomial function constructed according to the privacy set of the intersection initiator and a Lagrange interpolation method.

3. A method for obtaining a privacy set intersection by an intersection server, comprising:

receiving a cipher text, a cipher text function, and a public key from an intersection initiator, wherein the cipher text, the cipher text function, and the public key are obtained by the intersection initiator by encrypting a privacy set of the intersection initiator using a homomorphic encryption algorithm; and bringing each element in the privacy set of the intersection server to the cipher text function, and calculating a cipher text function value of each element, wherein in response to a cipher text function value of a certain element in the privacy set of the intersection server being equal to 0, determining that the element is an intersection of the privacy set of the intersection server and the privacy set of the intersection initiator;

wherein the method further comprises:
  encrypting the privacy set of the intersection server according to the public key received from the intersection initiator to generate a cipher text of the privacy set of the intersection server;
  calculating a random security function value corresponding to each element in the cipher text of the privacy set of the intersection server according to a random security function, wherein the random security function is used to randomize a random security function value corresponding to a cipher text of a non-intersection element in the privacy set of the intersection server; and
  delivering the random security function value corresponding to each element in the privacy set of the intersection server to the intersection initiator.

4. The method according to claim 3, wherein the encrypting the privacy set of the intersection server according to the public key received from the intersection initiator to generate a cipher text of the privacy set of the intersection server comprises:
  constructing a parameter set according to the privacy set of the intersection server and a hidden function, wherein the hidden function is used to perform mapping protection on the privacy set of the intersection server, and element information in the parameter set hides element information of the privacy set of the intersection server; and
  encrypting the parameter set by using the public key to generate a cipher text value set of the parameter set, wherein element information in the cipher text value set is the cipher text of the privacy set of the intersection server.

5. The method according to claim 3, wherein the calculating a random security function value corresponding to each element in the cipher text of the privacy set of the intersection server according to the random security function comprises:
  calculating a hidden function value of the privacy set of the intersection initiator according to a parameter set constructed by the intersection initiator and the hidden function, wherein the hidden function is used to perform mapping protection on the privacy set of the intersection initiator;
  randomizing the hidden function value of the privacy set of the intersection server by using a perturbation number; and
  adding a randomization processing result of the hidden function value of the privacy set of the intersection server to the cipher text of the privacy set of the intersection server to obtain a random security function value corresponding to each element in the cipher text of the privacy set of the intersection server.

6. The method according to claim 4, wherein the hidden function is a polynomial function constructed according to a privacy set and a Lagrange interpolation method.

7. An electronic device, comprising:
  at least one processor; and
  a memory in communication with the at least one processor;
  wherein the memory stores instructions executable by the at least one processor, the instructions when executed by the at least one processor, cause the at least one processor to perform operations, comprising:
  encrypting a privacy set of an intersection initiator by using a homomorphic encryption algorithm to generate a cipher text, a cipher text function, a public key, and a private key of the intersection initiator by: constructing a parameter set according to the privacy set of the intersection initiator and a hidden function, wherein the hidden function is used to perform mapping protection on the privacy set of the intersection initiator, and element information in the parameter set hides element information of the privacy set of the intersection initiator; and encrypting the parameter set by using the public key to generate a cipher text value set of the parameter set, wherein element information in the cipher text value set is the cipher text of the intersection initiator;
  delivering the cipher text, the cipher text function, and the public key of the intersection initiator to an intersection server;
  receiving a to-be-decrypted function value of a privacy set of the intersection server from the intersection server, wherein the to-be-decrypted function value of the privacy set of the intersection server is obtained by the intersection server based on the public key, the privacy set of the intersection server, and a random security function, wherein the random security function is used to randomize a non-intersection element in the privacy set of the intersection server; and
  decrypting the to-be-decrypted function value of the privacy set of the intersection server by using the private key, to obtain an intersection element of the privacy set of the intersection initiator and the privacy set of the intersection server.

8. The electronic device according to claim 7, wherein the hidden function is a polynomial function constructed according to the privacy set of the intersection initiator and a Lagrange interpolation method.

9. An electronic device, comprising:
  at least one processor; and
  a memory in communication with the at least one processor;
  wherein the memory stores instructions executable by the at least one processor, the instructions when executed by the at least one processor, cause the at least one processor to perform operations, comprising:
  receiving a cipher text, a cipher text function, and a public key from an intersection initiator, wherein the cipher text, the cipher text function, and the public key are obtained by the intersection initiator by encrypting a privacy set of the intersection initiator using a homomorphic encryption algorithm; and
  bringing each element in the privacy set of the intersection server to the cipher text function, and calculating a cipher text function value of each element, wherein in response to a cipher text function value of a certain element in the privacy set of the intersection server being equal to 0, determining that the element is an intersection of the privacy set of the intersection server and the privacy set of the intersection initiator;
  wherein the operations further comprise:
  encrypting the privacy set of the intersection server according to the public key received from the intersection initiator to generate a cipher text of the privacy set of the intersection server;
  calculating a random security function value corresponding to each element in the cipher text of the privacy set of the intersection server according to a random security function, wherein the random security function is used to randomize a random security function value corresponding to a cipher text of a non-intersection element in the privacy set of the intersection server; and delivering the random security function value corresponding to each element in the privacy set of the intersection server to the intersection initiator.

10. The electronic device according to claim 9, wherein the encrypting the privacy set of the intersection server according to the public key received from the intersection initiator to generate a cipher text of the privacy set of the intersection server comprises:
   constructing a parameter set according to the privacy set of the intersection server and a hidden function, wherein the hidden function is used to perform mapping protection on the privacy set of the intersection server, and element information in the parameter set hides element information of the privacy set of the intersection server; and
   encrypting the parameter set by using the public key to generate a cipher text value set of the parameter set, wherein element information in the cipher text value set is the cipher text of the privacy set of the intersection server.

11. The electronic device according to claim 9, wherein the calculating a random security function value corresponding to each element in the cipher text of the privacy set of the intersection server according to the random security function comprises:
   calculating a hidden function value of the privacy set of the intersection initiator according to a parameter set constructed by the intersection initiator and the hidden function, wherein the hidden function is used to perform mapping protection on the privacy set of the intersection initiator;
   randomizing the hidden function value of the privacy set of the intersection server by using a perturbation number; and
   adding a randomization processing result of the hidden function value of the privacy set of the intersection server to the cipher text of the privacy set of the intersection server to obtain a random security function value corresponding to each element in the cipher text of the privacy set of the intersection server.

12. The electronic device according to claim 10, wherein the hidden function is a polynomial function constructed according to a privacy set and a Lagrange interpolation method.

13. A non-transitory computer-readable storage medium, storing computer instructions thereon, wherein the computer instructions are used to cause a computer to perform the method of claim 1.

14. A non-transitory computer-readable storage medium, storing computer instructions thereon, wherein the computer instructions are used to cause a computer to perform the method of claim 3.

* * * * *